H. G. SLINGLUFF.
GLASS DRAWING APPARATUS.
APPLICATION FILED MAY 16, 1916.
1,251,932. Patented Jan. 1, 1918.
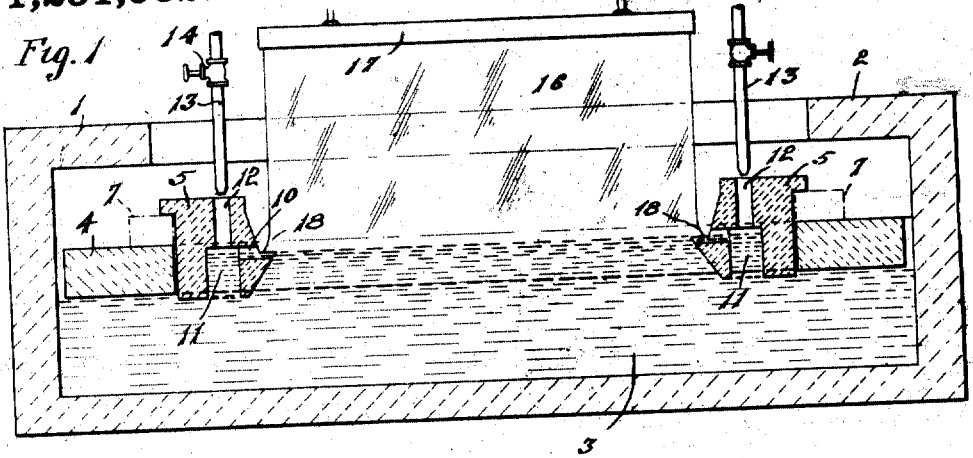
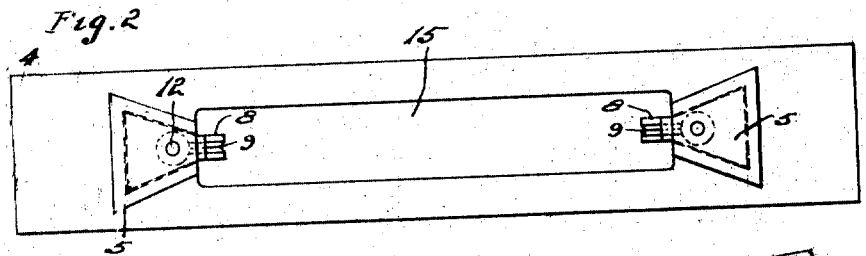
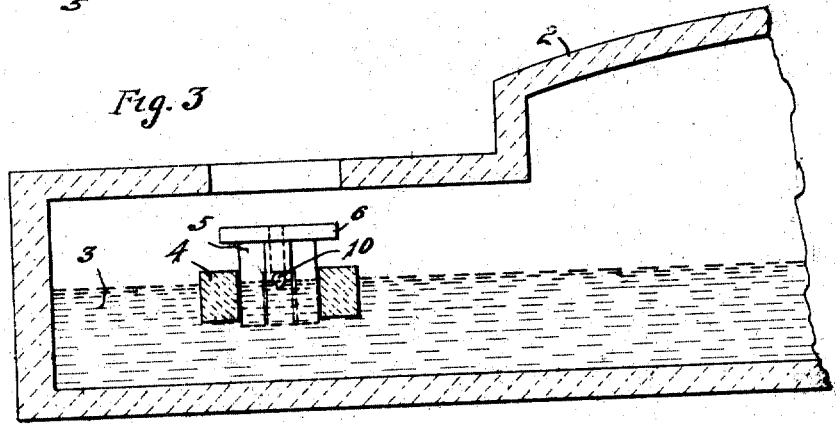
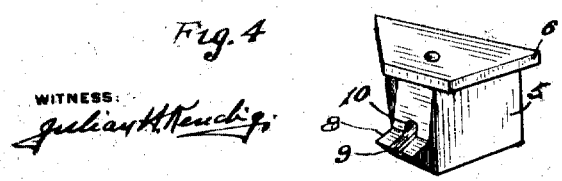

UNITED STATES PATENT OFFICE.

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-DRAWING APPARATUS.

1,251,932. Specification of Letters Patent. Patented Jan. 1, 1918.

Application filed May 16, 1916. Serial No. 97,797.

*To all whom it may concern:*

Be it known that I, HARRY G. SLINGLUFF, a citizen of the United States, residing at Mount Vernon, in the county of Knox and State of Ohio, have invented certain new and useful Improvements in Glass-Drawing Apparatus, of which the following is a specification.

The invention relates to apparatus for drawing glass in sheets from a batch of molten glass. It has for its primary object the provision of an improved construction for controlling the draw at the edges under the varying conditions in the furnace; and the provision of improved means for applying a cooling fluid at the edges of the glass sheet to secure a stiffening of the glass at such points such as will prevent a pulling in of the edges. One embodiment of the invention is illustrated in the accompanying drawings, wherein—

Figure 1 is a section through my improved apparatus; Fig. 2 is a plan view of the drawing member; Fig. 3 is a section through the apparatus at right angles to that of Fig. 1; and Fig. 4 is an enlarged perspective view of one of the drawing blocks carried by the drawing member.

Referring to Figs. 1 and 3, the reference numeral 1 designates a drawing extension in communication with a melting tank 2 and carrying a glass bath 3; 4 is the drawing member preferably floating in the bath; and 5, 5 are drawing blocks mounted for vertical adjustment in the member 4.

The members 5 are provided at their upper ends with flanges 6 and are held at any desired height by means of refractory blocks 7 fitting under the flanges. A series of blocks 7 may be employed of varying thickness in order to give different vertical adjustments of the blocks 5.

Each block 5 is provided with an extension or shelf 8 (Fig. 4) having its upper face grooved, as indicated at 9. This groove is extended in the form of a circular opening 10 leading into the interior of the block, and the adjustment of the block is such that the level of the glass preferably comes midway between the upper and lower sides of the opening 10. The opening 10 communicates at its inner end with a larger vertical opening 11 opening downwardly into the glass bath and upwardly into a somewhat smaller opening 12. Spaced above the opening 12 is an air supply pipe 13 through which air may be directed into the passage 12, the amount being controlled by means of a valve 14.

The drawing member 4 is provided with an elongated opening 15 (Fig. 2) into which the ledges 8 project, and the glass sheet 16 is drawn from the opening 15 with its edges above the shelves 8, as indicated in Fig. 1. Any desired form of bait 17 may be employed, and the handling the glass sheet as it is elongated beyond the length indicated in Fig. 1 may be accomplished in various ways and has nothing to do with the present invention, which relates to the initial formation of the sheet.

I find that by the use of the shelves 8 and the air passages in the blocks 5, I can control the formation of the edges of the sheet of glass. The tendency of the edges is to draw in toward the center of the sheet but this is overcome by cooling the edges rapidly and is secured by the use of the air which flows down through the passages 12 and then laterally through the passages 10 cooling the glass in the grooves 9 and also the edges of the sheet as it is formed, such edges assuming the form as indicated at 18 (Fig. 1). If, by reason of changes of temperature in the glass bath or forehearth, the edges of the sheet start to draw in, this tendency can be overcome by opening the valves 14 farther and permitting a greater flow of air and a greater cooling of the glass at the edges of the sheet. By regulating the amount of air I can control the position of the glass edges, thus keeping the sheet of exactly the proper width and preventing any interruption of the drawing.

The length of the ledges 8 may be varied to suit requirements, and their extension beneath the edges of the sheet assists materially in keeping such edges and the glass thereabove at the proper temperature, since the ledges act as shields and prevent the glass at the edges of the sheet from becoming too hot and fluid. The drawing is illustrated as occurring from a forehearth, but it is obviously immaterial, in so far as the present invention is concerned, what form of glass bath or furnace construction is employed. The making of the drawing blocks 5 separate from the drawing member 4 is advantageous in that adjustment is permitted and in that the blocks 5 may be renewed without replacing the entire drawing member as would be the case if the drawing blocks were made integral with the drawing member. The drawing from the slot 15 rather than from two entirely independent drawing blocks has the advantage that the body of glass in the slot 15 is segregated from the main body of glass and reduced in temperature, and impurities are prevented from floating along the surface and being brought up with the sheet, such as would be the case if the sides of the slot were omitted and the two ends located independently of each other in the glass batch. Under certain conditions the air supply from the pipe 13 may be dispensed with entirely, such conditions involving the temperature of the glass bath, the rapidity of the draw, and size of the cooling passages. The various advantages incident to my construction will be apparent to those skilled in the art.

What I claim is:

1. In glass drawing apparatus employing a glass bath from which a sheet of glass is to be drawn, refractory means at the edges of the glass provided with passages lying in the molten glass and extending laterally from the edges of the sheet and then downwardly and adapted to supply molten glass to the sheet at the edges thereof.

2. In glass drawing apparatus employing a glass bath from which a sheet of glass is to be drawn, refractory means at the edges of the glass provided with passages lying in the molten glass and extending laterally from the edges of the sheet and then downwardly and adapted to supply molten glass to the sheet at the edges thereof, and projecting portions on the refractory means extending beneath the edges of the sheet.

3. In glass drawing apparatus employing a glass bath from which a sheet of glass is to be drawn, refractory means at the edges of the sheet provided with projecting ledges lying beneath the edges of the sheet being drawn, and provided with passages whereby a flow of air may be directed against the edges of the sheet adjacent the surface of the glass bath.

4. In glass drawing apparatus employing a glass bath from which a sheet of glass is to be drawn, refractory means at the edges of the sheet provided with projecting ledges lying beneath the edges of the sheet being drawn, and means for applying a cooling medium to the edges of the glass adjacent the ledges.

5. In glass drawing apparatus employing a glass bath from which a sheet of glass is to be drawn, refractory means at the edges of the sheet provided with grooved projecting ledges lying beneath the sheet being drawn, and means for applying a cooling medium to the edges of the glass adjacent the ledges.

6. In glass drawing apparatus employing a glass bath from which a sheet of glass is to be drawn, refractory means at the edges of the sheet provided with grooved projecting ledges lying beneath the sheet being drawn and provided with passages in alinement with the grooves for applying a cooling medium to the edges of the glass above the ledges.

7. In glass drawing apparatus employing a glass bath from which a sheet of glass is to be drawn, a refractory block in the glass having an elongated drawing opening, and separate blocks mounted at the ends of the opening and provided with drawing ledges adapted to lie beneath the edges of the glass sheet being drawn.

8. In glass drawing apparatus employing a glass bath from which a sheet of glass is to be drawn, a refractory block in the glass having an elongated drawing opening, and separate blocks mounted at the ends of the opening and provided with drawing ledges adapted to lie beneath the edges of the glass sheet being drawn, the said separate blocks being adjustable vertically.

9. In glass drawing apparatus employing a glass bath from which a sheet of glass is to be drawn, a refractory block in the glass having an elongated drawing opening, and separate blocks mounted at the ends of the opening and provided with drawing ledges adapted to lie beneath the edges of the glass sheet being drawn, and also provided with passages whereby air may be directed against the edges of the sheet above the said ledges.

10. In glass drawing apparatus employing a glass bath from which a sheet of glass is to be drawn, refractory means at the edges of the sheet provided with lateral passages at the surface of the glass partially filled thereby, and means for supplying air through the unfilled portions of the passages laterally against the edges of the sheet being drawn.

11. In glass drawing apparatus employing a glass bath from which a sheet of glass is to be drawn, refractory means at the edges of the sheet provided with lateral passages at the surface of the glass partially filled thereby and with downwardly extending passages communicating with the first passages and with the glass bath beneath, and means for supplying air to the said passages to cause a flow of air through the lateral passages and against the edges of the glass sheet being drawn.

HARRY G. SLINGLUFF.